(12) United States Patent
Jancowski-Walsh et al.

(10) Patent No.: US 10,926,769 B1
(45) Date of Patent: Feb. 23, 2021

(54) METHOD AND SYSTEM OF CONTROLLING A QUICK SUCCESSION DRIVE-NEUTRAL-DRIVE (D-N-D) SHIFT

(71) Applicant: GM Global Technology Operations LLC, Detroit, MI (US)

(72) Inventors: John Jancowski-Walsh, Fenton, MI (US); Zhuoran Zhang, Ann Arbor, MI (US); Dara Monajemi, Lansing, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2 days.

(21) Appl. No.: 16/573,268

(22) Filed: Sep. 17, 2019

(51) Int. Cl.
| | | |
|---|---|---|
| *B60W 30/19* | (2012.01) | |
| *B60W 10/11* | (2012.01) | |
| *F16H 61/02* | (2006.01) | |
| *B60W 10/02* | (2006.01) | |
| *F16H 61/682* | (2006.01) | |
| *F16H 61/16* | (2006.01) | |

(52) U.S. Cl.
CPC ............ *B60W 30/19* (2013.01); *B60W 10/02* (2013.01); *B60W 10/11* (2013.01); *F16H 61/0213* (2013.01); *F16H 61/16* (2013.01); *F16H 61/682* (2013.01); *B60W 2510/0208* (2013.01); *B60W 2510/0241* (2013.01); *B60W 2510/10* (2013.01); *B60W 2710/1005* (2013.01); *F16H 2061/0218* (2013.01); *F16H 2061/161* (2013.01); *F16H 2200/006* (2013.01)

(58) Field of Classification Search
CPC ...... B60W 30/19; B60W 10/02; B60W 10/11; B60W 61/0213; B60W 61/16; B60W 61/682; B60W 2510/0208; B60W 2510/0241; B60W 2510/10; B60W 2710/1005; B60W 2061/0218; B60W 2061/161; B60W 2200/006
See application file for complete search history.

(56) References Cited

U.S. PATENT DOCUMENTS

| | | | | |
|---|---|---|---|---|
| 5,655,993 | A * | 8/1997 | Fujimoto | ............ F16H 61/0437 475/118 |
| 7,669,464 | B2 * | 3/2010 | Dankbaar | ............ F16H 59/0204 73/115.03 |
| 9,249,881 | B1 | 2/2016 | Monajemi et al. | |
| 10,053,099 | B2 | 8/2018 | Monajemi et al. | |
| 2007/0010927 | A1 | 1/2007 | Rowley et al. | |

FOREIGN PATENT DOCUMENTS

EP 738845 A2 * 10/1996 ............. F16H 59/38

* cited by examiner

*Primary Examiner* — Tinh Dang

(57) ABSTRACT

A method and system of controlling a drive-neutral-drive (D-N-D) shift in a multi-speed transmission. The method includes receiving a drive to neutral (D-N) shift request followed by a neutral to drive (N-D) shift request; initiating a drive to neutral (D-N) shift and determining an attained gear; determining a scheduled gear; determining if the scheduled gear is equal to the attained gear; and determining whether an off-going clutch for the drive to neutral (D-N) shift is in a hold state. The method further includes (I) aborting the drive to neutral (D-N) shift when (i) the scheduled gear is not equal to the attained gear and (ii) the off-going clutch for the (D-N) shift is in the hold state, or (II) completing a shift to neutral (N) when the off-going clutch for (D-N) shift is not in the hold state followed by shifting back drive (D).

20 Claims, 7 Drawing Sheets

| GEAR STATE | TTM | | | | |
|---|---|---|---|---|---|
| | 126 | 124 | 130 | 128 | 132 |
| Reverse | X | X | | | X |
| Neutral | O | O | | | |
| 1st | X | X | | X | |
| 2nd | X | X | X | | |
| 3rd | | X | X | X | |
| 4th | | X | X | | X |
| 5th | | X | | X | X |
| 6th | | | X | X | X |
| 7th | X | | | X | X |
| 8th | X | | X | | X |

METHOD AND SYSTEM OF CONTROLLING A QUICK SUCCESSION DRIVE-NEUTRAL-DRIVE (D-N-D) SHIFT

INTRODUCTION

The present disclosure relates to methods and systems for controlling a vehicle multiple speed transmission having a plurality of planetary gear sets and a torque transmitting devices, more particularly to controlling a quick succession Drive-Neutral-Drive shift request.

A typical modern multiple speed transmission having planetary gear arrangements uses a combination of friction clutches and fixed interconnections to achieve a plurality of gear ratios. Within the planetary gear arrangements of the transmission, for example, three friction clutches may require activation for achieving any gear ratio. For a sequential gear ratio change, for example from a 3rd gear ratio to a 4th gear ratio change, two friction clutches are required to be activated, in which one friction clutch is de-activated while another is activated. From a drive gear ratio to neutral shift, for example from a $3^{rd}$ gear ratio to neutral, multiple friction non-common clutches are deactivated. From a neutral shift to a drive gear ratio shift, for example from neutral back to the $3^{rd}$ gear ratio, multiple non-common and common friction clutches are activated.

In normal driving conditions, there may be situations where an operator of the vehicle or an electronic transmission controller executes a drive gear ratio to neutral and back to a drive gear ratio shift, as referred to as a D-N-D shift, in relatively quick succession. An examples of a quick succession D-N-D shift occurrence includes the transmission controller shifting the transmission in neutral to minimize engine drag under certain driving conditions, but then immediate re-shifts into a drive ratio when driving conditions changed. Another example of a quick succession D-N-D shift occurrence include the operator shifting the transmission in neutral as the vehicle is coasting to stop traffic signal and then shifts back into a drive ratio as the traffic signal changes.

In implementations of a quick succession D-N-D shift, the transmission controller may fully deactivate multiple friction clutches before re-activating the same or different friction clutches to return the transmission to a desired drive gear ratio, which may or may not be the same drive ratio immediately before the neutral shift. Such D-N-D shifting controls may give a perception of significant hesitation and sub-optimal shift quality to the operator of the vehicle. This perception of sub-optimal shift quality might be amplified by a significant difference in drive gear ratios before the shift to neutral and the desired drive gear ratio when the transmission is shifted back to a drive ratio from neutral.

Thus, while current transmission controls achieve their intended purpose in implementing quick succession D-N-D shifts, the need for new and improved method and system to control D-N-D shifts to ensure operators expectations are achieved is essentially constant. Accordingly, there is a need for an improved and reliable multiple speed transmission control method and system for implementing quick succession D-N-D shifts.

SUMMARY

According to several aspects, method of controlling a quick succession drive-neutral-drive (D-N-D) shift in a multi-speed transmission is provided. The method includes receiving a D-N-D shift request comprising a drive to neutral (D-N) shift request followed by a neutral to drive (N-D) shift request; initiating a drive to neutral (D-N) shift and determining an attained gear after receiving the drive to neutral (D-N) shift request; determining a scheduled gear after receiving the neutral to drive (N-D) request; determining if the scheduled gear is equal to the attained gear; determining whether an off-going clutch for attaining the drive to neutral (D-N) shift is in a hold state; and aborting the drive to neutral (D-N) shift and shifting into one of the attained gear and scheduled gear when (i) the scheduled gear is not equal to the attained gear and (ii) the off-going clutch for attaining the drive to neutral (D-N) shift is in the hold state.

In an additional aspect of the present disclosure, the method further includes completing a shift to neutral (N) when the off-going clutch for attaining the drive to neutral (D-N) shift is not in the hold state; and shifting into one of the attained gear and scheduled gear from neutral (N).

In another aspect of the present disclosure, the method further includes determining whether the off-going clutch for attaining the drive to neutral (D-N) shift is in a released state when the scheduled gear is equal to the attained gear; completing a shift to neutral (N) when the off-going clutch for attaining the drive to neutral (D-N) shift is in the released state; and shifting into the scheduled gear from neutral (N).

In another aspect of the present disclosure, the method further includes determining whether a predetermined number of holding clutches for attaining the drive to neutral (D-N) shift are below a predetermined slip criterion for a predetermined amount of time when the off-going clutch for attaining the drive to neutral (D-N) shift is not released; aborting the drive to neutral (D-N) shift and shifting into the scheduled gear when the predetermined number of holding clutches are below a predetermined slip criterion for a predetermined amount of time.

In another aspect of the present disclosure, the method further includes completing a shift to neutral (N) when the predetermined number of holding clutches are not below the predetermined slip criterion for the predetermined amount of time; and shifting into the scheduled gear from neutral (N).

In another aspect of the present disclosure, the method further includes determining whether the multi-speed transmission is in a process of shifting from the attained gear to a command gear upon receiving the drive to neutral (D-N) shift request; determining whether an off-going clutch for attaining the attained gear to the command gear shift is in a released state; and updating the attained gear to equal to the command gear when the off-going clutch for attaining the attained gear to the command gear shift is in a released state.

In another aspect of the present disclosure, the method further includes applying a two stage pressure ramp when activating an on-coming/off-going holding clutch for attaining one of a D-N shift, N-D shift, and D-D shift. The two stage pressure ramp includes a first stage having a first pressure profile followed by a second stage having a second pressure profile. The second pressure profile includes a more aggressive pressure profile than the first pressure profile.

In another aspect of the present disclosure, the method further includes releasing one of an on-coming clutch and/or an off-going clutch using a steadily declining pressure profile such that an obtrusive shock to the multi-speed transmission is minimized.

In another aspect of the present disclosure, the determining whether all holding clutches are below a predetermined slip criterion for a predetermined amount of time, includes looping through each holding clutch to determine whether each clutch is below a calibrated amount of slip. In another aspect of the present disclosure, the predetermined number of holding clutches is equal to all the holding clutches required for a drive to neutral (D-N) shift.

According to several aspects, a method of controlling a quick succession drive-neutral-drive (D-N-D) shift in a multi-speed transmission is disclosed. The method includes receiving a D-N-D shift, including a drive to neutral (D-N) shift request followed by a neutral to drive (N-D) shift request; determining whether the multi-speed transmission is in a process of shifting from an attained gear to a command gear during the D-N shift request; determining whether an off-going clutch is in a released state when the multi-speed transmission is in the process of shifting from the initial attained gear to the command gear during the D-N request; updating the attained gear equal to the command gear when the off-going clutch is in a released state; determining a scheduled gear following the neutral to drive (N-D) request; determining if the scheduled gear is equal to the attained gear; determining whether an off-going clutch for the drive to neutral (D-N) shift is in a hold state; and implement one of the following: (I) aborting the drive to neutral (D-N) shift and shifting into one of the attained gear and scheduled gear when (i) the scheduled gear is not equal to the attained gear, and (ii) the off-going clutch for the drive to neutral (D-N) shift is in the hold state; and (II) completing a shift to neutral (N) when the off-going clutch for the drive to neutral (D-N) shift is not in the hold state followed by shifting from neutral (N) into one of the attained gear and scheduled gear.

In another aspect of the present disclosure, the method further includes determining whether the off-going clutch for the drive to neutral (D-N) shift is in a released state when the scheduled gear is equal to the attained gear; completing a shift to neutral (N) when the off-going clutch for the drive to neutral (D-N) shift is in the released state; and shifting into the scheduled gear from neutral (N).

In another aspect of the present disclosure, the method further includes determining whether all holding clutches are below a predetermined slip criterion for a predetermined amount of time when the off-going clutch for the drive to neutral (D-N) shift; and implementing one of the following: (I) aborting the drive to neutral (D-N) shift and shifting into the scheduled gear when all holding clutches are below a predetermined slip criterion for a predetermined amount of time; and (II) completing a shift to neutral (N) when all holding clutches are not below a predetermined slip criterion for a predetermined amount of time, and shifting into the scheduled gear from neutral (N).

In another aspect of the present disclosure, the method further includes engaging an on-coming/off-going holding clutch for shifting for one of a drive to neutral (D-N), a neutral to drive (N-D) shift, and a drive to drive (D-D) shift by applying a two stage pressure ramp; and dis-engaging an off-going/on-coming clutch by applying a steadily declining pressure profile.

In another aspect of the present disclosure, the two stage pressure ramp includes a first stage having a first pressure profile followed by a second stage having a second pressure profile, wherein the second pressure profile is more aggressive than the first pressure profile.

According to several aspects, a system for controlling a drive-neutral-drive (D-N-D) shift in a multi-speed transmission is disclosed. The system includes a multi-speed transmission; a shifter configured to receive a D-N-D shift command; and a transmission controller in electronic communication with the multi-speed transmission and the shifter. The transmission controller includes a non-transitory computer readable medium storing instructions to implement a method for controlling a D-N-D shift of the multi-speed transmission and a processor configured for accessing the instructions and implementing the method. The method includes receiving a D-N-D shift, including a drive to neutral (D-N) shift request followed by a neutral to drive (N-D) shift request, determining a shift abort sequence upon receiving the drive to neutral (D-N) shift request, and implementing the shift abort sequence, wherein the shift abort sequence includes one of (i) aborting the shift to neutral resulting in a drive to drive (D-D) shift and (ii) shifting into neutral (N) before shifting back into drive (D).

In an additional aspect of the present disclosure, determining a shift abort sequence includes determining a scheduled gear following the neutral to drive (N-D) request; determining if the scheduled gear is equal to the attained gear; determining whether an off-going clutch for the drive to neutral (D-N) shift is in a hold state; and aborting the drive to neutral (D-N) shift and shifting into one of the attained gear and scheduled gear when (i) the scheduled gear is not equal to the attained gear and (ii) the off-going clutch for the drive to neutral (D-N) shift is in the hold state.

In another aspect of the present disclosure, determining a shift abort sequence further includes determining whether the off-going clutch for the drive to neutral (D-N) shift is in a released state when the scheduled gear is equal to the attained gear; and completing a shift to neutral (N) when the off-going clutch for the drive to neutral (D-N) shift is in the released state.

In another aspect of the present disclosure, determining a shift abort sequence further includes determining whether a predetermined number of holding clutches are below a predetermined slip criterion for a predetermined amount of time when the off-going clutch for the drive to neutral (D-N) shift; and aborting the drive to neutral (D-N) shift and shifting into the scheduled gear when the predetermined number of holding clutches are below a predetermined slip criterion for a predetermined amount of time.

In another aspect of the present disclosure, determining a shift abort sequence further includes completing a shift to neutral (N) when the predetermined number of holding clutches are not below a predetermined slip criterion for a predetermined amount of time.

In another aspect of the present disclosure, determining a shift abort sequence further includes engaging an on-coming/off-going holding clutch for shifting to attain one of a drive to neutral (D-N), a neutral to drive (N-D) shift, and a drive to drive (D-D) shift using a two stage pressure ramp; and dis-engaging an off-going/on-coming clutch using a steadily declining pressure profile.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
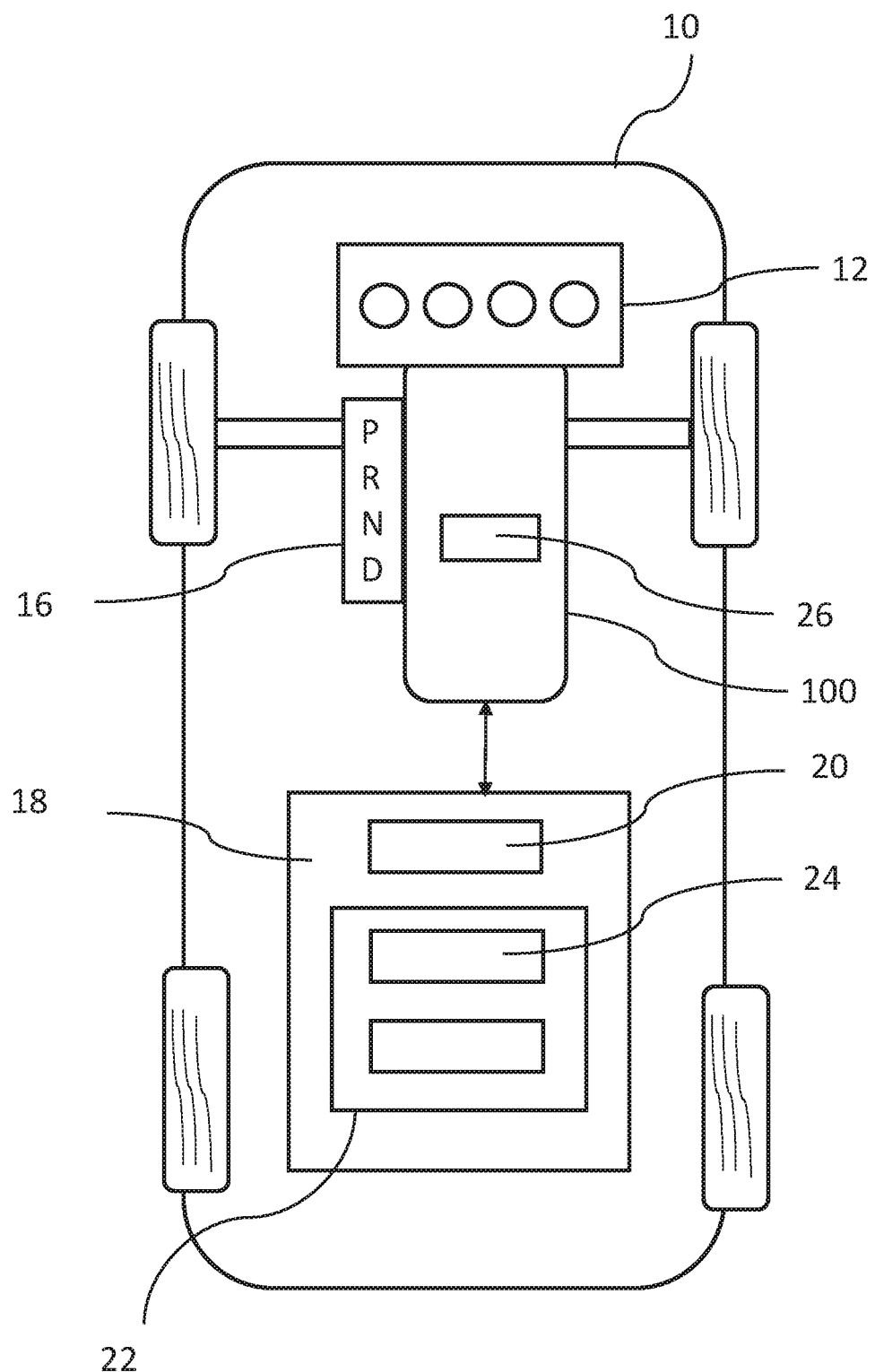
FIG. 1 is a schematic diagram of a vehicle having a control system for a multiple speed transmission, according to an exemplary embodiment.

Referring to FIG. 1, is a motor vehicle 10 having an engine 12 connected to a transmission 100. The engine 12 may be a conventional internal combustion engine, an electric motor, a hybrid internal combustion-electric motor, or any other type of drive torque producing power plant. A torque converter (not shown) may be disposed between the engine 12 and the transmission 100 for selectively suppling a drive torque from the engine 12 to the transmission 100.

The transmission 100 is a multiple speed fixed-gear transmission 100, also referred to as a multi-speed transmission 100, having a plurality of planetary gear arrangements utilizing a combination of friction clutches and fixed interconnections to achieve various gear ratios. The transmission 100 includes a manual selector 16 that is operable by an operable of the vehicle 10, also known as a driver, to shift the transmission 100 between a park mode (P), a reverse mode (R), a neutral mode (N), and a drive mode (D). The drive mode (D) includes a plurality of forward drive gear ratios. The manual selector 16 may be mounted on a steering column (not shown) of the vehicle 10 or on a center console. The manual selector 16 may be mechanically connected to the transmission 100 through mechanical linkages or electronically connected to a transmission control module 18, also referred to as a transmission controller 18.

The transmission control module 18 is a non-generalized, electronic control device having a preprogrammed digital computer or processor 20, a memory 22 or non-transitory computer readable medium 22 used to store data such as control logic, software applications, instructions, computer code, data, lookup tables, etc. Computer readable medium includes any type of medium capable of being accessed by a computer, such as read only memory (ROM), random access memory (RAM), a hard disk drive, a compact disc (CD), a digital video disc (DVD), or any other type of memory. A non-transitory computer readable medium includes media where data can be permanently stored and media where data can be stored and later overwritten, such as a rewritable optical disc or an erasable memory device. Computer code includes any type of program code, including source code, object code, and executable code. The memory of the transmission control module 18 contains algorithms 24 that are accessible by the processor 20 to implement methods for controlling the shifting of the transmission 100. In drive mode, the transmission control module 18 receives information such as vehicle speed, acceleration, and engine load demand from various vehicle state sensors 26.

Execution of shifts between different speed ratios of the transmission 100 may occur in response to commands from the transmission controller 18, which may work in concert and communication with other control systems. The transmission controller 18 may primarily control the transmission 100 or may be part of a larger control system, such as a powertrain control module (PCM) or an engine control unit (ECU) (not shown). The processor 20 executes an algorithm to implement a method to select a proper gear ratio for the transmission 100 to operate. A gear ratio is also known as a torque ratio, torque multiplication, or speed ratio. Specific gear ratios of the transmission 100 may be referred to as specific gears, such as 1st gear, 2nd gear, 3rd gear, etc. or may be referred to as named gears, such as starting gear, initial target gear, adjusted target gear, reverse gear, etc. These gears refer to modes of operation in which specific speed ratios are active for the transmission 100, usually through selective actuation of torque-transmitting clutches, as detailed below.

Figure 2:
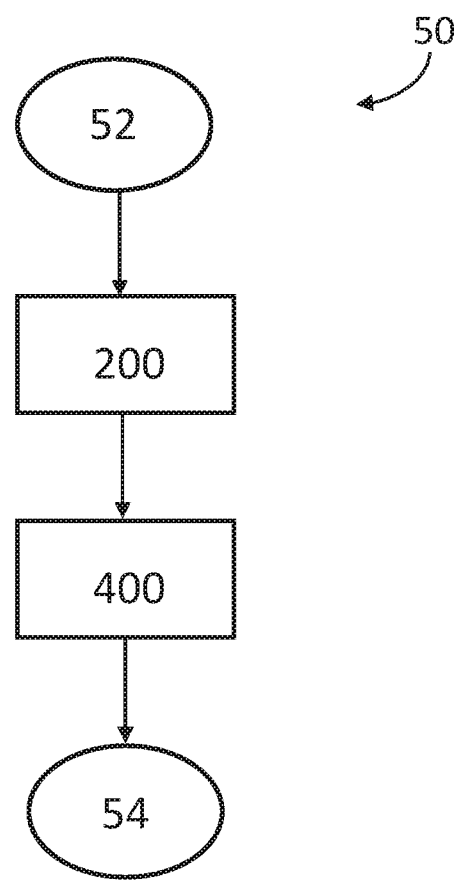
FIG. 2 is a flow chart depicting a method of implementing a quick succession Drive to Neutral back to Drive (D-N-D) shift request, according to an exemplary embodiment.

Referring to FIG. 2 is a flow chart of a method 50 for controlling a quick succession drive to neutral and return to drive (D-N-D) shift 50 is illustrated for the exemplary transmission 100. A quick succession D-N-D shift means that the operator of the vehicle 10 or transmission controller 18 requests the transmission to shift from a drive mode (D) to a neutral mode (N) and then requests to shift from the neutral mode (N) back to the drive mode (D) before the transmission completes the initial requested shift to neutral. Drive mode (D) and neutral mode (N) is also referred to as drive (D) and neutral (N), respectively. If the operator of the vehicle 10 requests the D-N-D shift, the controller 18 receives the request from the operator. Upon receiving the initial D-N request, the Method 50 determines an appropriate shift abort sequence and then controls the clutches to implement the shift abort sequence. The method starts in Block 52 when a motor vehicle is in an operating state, either in a moving or static state, the transmission is in a drive mode (D), and the driver or transmission controller requests a D-N-D request. The method 50 moves to Block 52, which includes a method of determining a shift abort sequence 200, and then moves to Block 54, which includes a method of clutch control 400 to implement the shift abort sequence as determined by method 200. The method 50 ends at Block 54 when the requested D-N-D shift is executed.

Figures 3, 4:
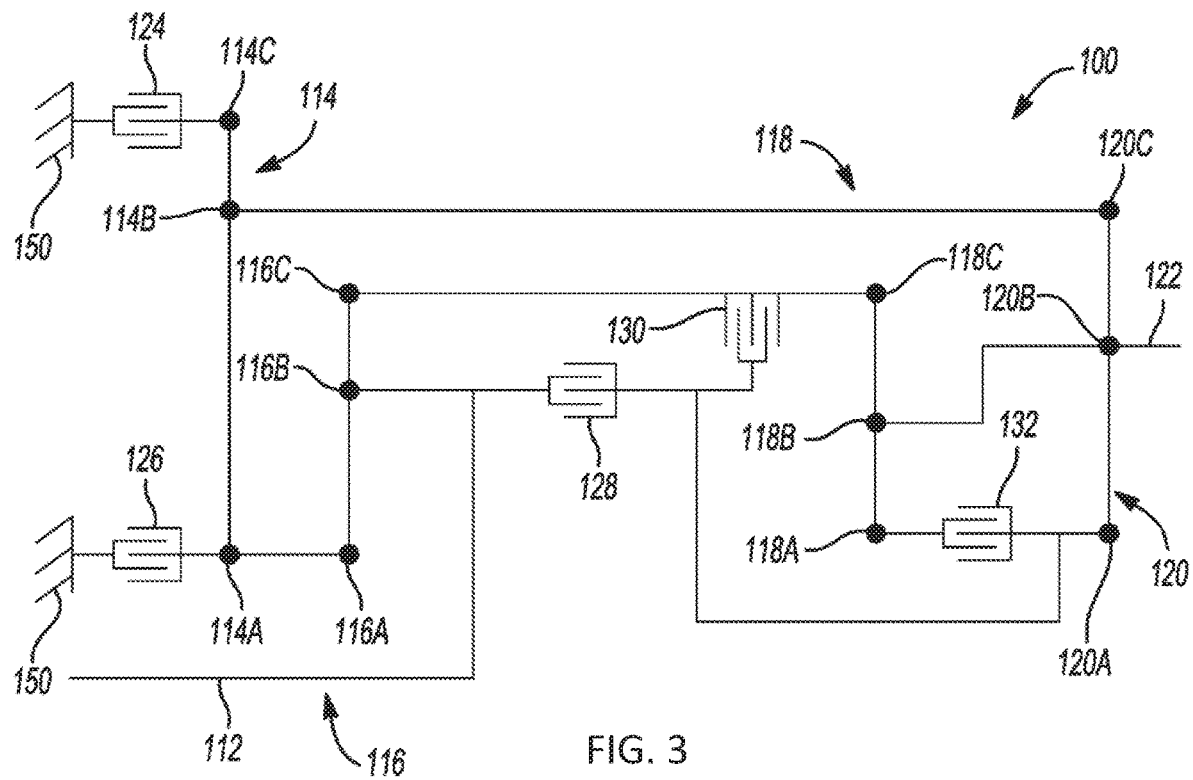
FIG. 3 is a lever analogy diagram of an embodiment of an eight speed transmission, according to an exemplary embodiment.
FIG. 4 is a truth table presenting the state of engagement of the various clutches of the transmission illustrated in FIG. 3, according to an exemplary embodiment.

Referring to FIG. 3, a lever analogy diagram illustrating an exemplary eight speed transmission 100 is shown. It should be appreciated that the eight-speed transmission 100 is presented as an example only and the disclosure is not intended to be limited to eight speed transmissions. A lever analogy diagram is a schematic representation of the components of the automatic transmission 100. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission 100 in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers.

Referring to FIG. 3, the transmission 100 includes an input shaft or member 112, a first planetary gear set 114 having three nodes: a first node 114A, a second node 114B and a third node 114C, a second planetary gear set 116 having three nodes: a first node 116A, a second node 1166 and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122.

The input member 112 is coupled to the second node 116B of the second planetary gear set 116. The output member 122 is coupled to the second node 120B of the fourth planetary gear set 120. The second node 114B of the first planetary gear set 114 is coupled to the third node 120C of the fourth planetary gear set 120. The first node 114A of the first planetary gear set 114 is coupled to the first node 116A of the second planetary gear set 116. The third node 116C of the second planetary gear set 116 is coupled to the third node 118C of the third planetary gear set 118. The second node 118B of the third planetary gear set 118 is coupled to the second node 120B of the fourth planetary gear set 120.

A first brake clutch 124 selectively connects the third node 114C of the first planetary gear set 114 with a stationary member or transmission housing 150. A second brake clutch 126 selectively connects the first node 114A of the first planetary gear set 114 with the stationary member or transmission housing 150. A first clutch 128 selectively connects the second node 116B of the second planetary gear set 116 to the first node 120A of the fourth planetary gear set 120. A second clutch 130 selectively connects the third node 116C of the second planetary gear set 116 and the third node 118C of the third planetary gear set 118 with the first node 120A of the fourth planetary gear set 120. A third clutch 132 selectively connects the first node 118A of the third planetary gear set 118 to the first node 120A of the fourth planetary gear set.

Shifting from one forward speed ratio to another is achieved by disengaging one or more engaged clutches, referred to as off-going clutches, while engaging one or more disengaged clutches, referred to as on-coming clutches. Clutches which remain engaged throughout the shift are referred to as holding clutches.

Referring to FIG. 4, a truth table presenting the various combinations of torque-transmitting mechanisms that are activated, also referred to as engaged, and de-activated, also referred to dis-engaged, to achieve the various gear states. An "X" in the box means that the particular clutch or brake is activated, also referred to as engaged, to achieve the desired gear state. It will be appreciated that transmission 100, represented by the lever diagram shown in FIG. 2, is capable of transmitting torque from the input shaft or member 112 to the output shaft or member 122 in at least eight forward gear ratios and at least one reverse gear ratio.

Each forward and reverse gear ratio is attained by engagement of three of the torque-transmitting mechanisms (i.e. first brake clutch 124, second brake clutch 126, first clutch 128, second clutch 130, third clutch 132), as will be explained below. To establish a reverse gear, the first brake clutch 124, the second brake clutch 126, and the third clutch 130 are engaged. The first brake clutch 124 connects the second interconnecting shaft with the stationary member or transmission housing 150 in order to restrict the ring gear member 114C from rotating relative to the stationary member or transmission housing 150. The second brake 126 connects the first interconnecting shaft with the stationary member or transmission housing 150 in order to restrict the sun gear member 114A from rotating relative to the stationary member or transmission housing 150. The third clutch 130 connects the fourth interconnecting shaft with the seventh interconnecting shaft. Likewise, the eight forward ratios are achieved through different combinations of clutch and brake engagement, as shown in FIG. 3.

A holding-clutch is a clutch that remains engaged in a shift from one given gear ratio to another given gear ratio. An off-going clutch is a clutch that is released or disengaged as another clutch (on-coming clutch) is applied or engaged to obtain a new gear ratio in a shift. An on-coming clutch is a clutch that is applied or engaged as an off-going clutch is released or disengaged to obtain the new gear ratio in the shift. For example, in a 4th to 5th gear ratio shift, the second clutch 130 is an off-going clutch, the first clutch 128 is the on-coming clutch, and both the first brake clutch 124 and third clutch 132 are holding clutches.

Referring back to FIG. 1, the transmission control module 18, also referred to as a transmission controller 18, controls the actuation of the plurality of torque transmitting mechanisms via a hydraulic control system (not shown) to engage and disengage selective clutches 124, 126, 128, 130, 132 to achieve the desired gear ratio. The control logic may be implemented in hardware, software, or a combination of hardware and software. For example, control logic 24 may be in the form of program code that is stored on the electronic memory storage 22 and executable by the processor 20. The transmission controller 18 receives the output signals of several vehicle state sensors 26 throughout the vehicle 10 including the transmission 100 and engine 12, performs the control logic 24 and sends command signals to the hydraulic control system to engage and disengage selective clutches to enact gear ratio shifts.

Figure 5:
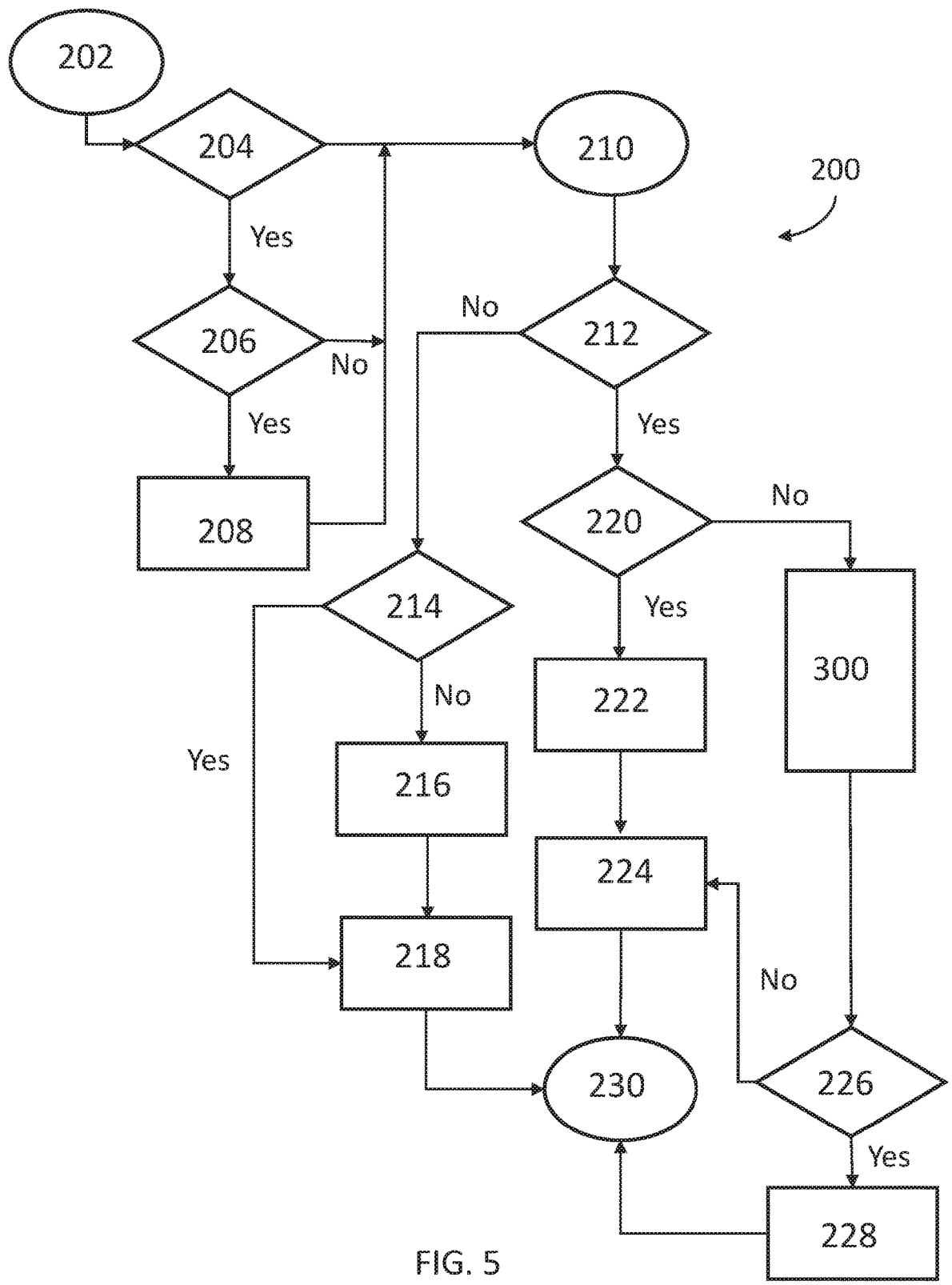
FIG. 5 is a flow chart depicting a method for determining the shift abort sequence portion of the method of FIG. 2, according to an exemplary embodiment.

Referring to FIG. 5, a flow chart depicting the method 200 of determining a shift abort sequence is illustrated. The method 200 determines how the transmission will enter the drive to neutral (D-N) shift and how the transmission will return to drive as quickly as possible, by way of a neutral to drive (N-D) or drive to drive (D-D) shift, in a controlled fashion with minimal disturbance to the operator. The duration of a shift to neutral (N) varies based on many factors (i.e. physical inputs to the transmission, differences in spinning transmission components, and how the shift is configured/calibrated). The method 200 begins in Block 202 when either the operator of the vehicle 10 via the gear selector or from the transmission controller 18 requests the transmission 100 to shift from the drive (D) to the Neutral (N), also referred to a D-N shift request.

Moving to Decision Block 204, the transmission controller 18 determines if the transmission 100 is currently already in a process of shifting from an attained gear to a command gear. The attained gear is the gear ratio that the transmission 100 was last in before the initiation of the shift to the command gear. The commanded gear is the gear sought by the transmission. The commanded gear may be determined by the transmission controller from analysis of the powertrain considering the operator's request and operating conditions of the vehicle. In other words, the command gear is the gear ratio that the transmission 100 is attempting to attain (i.e. shifts into), which may be a higher gear ratio or a lower ratio. For example, in a 3rd to 4th gear (3-4) shift, the 3rd gear ratio is the attained gear and the 4th gear ratio is the command gear. The attained gear ratio and the command gear ratio do not necessarily have to be in sequential order. An example of a non-sequential order shift includes a 3rd to 5th gear (3-5) shift.

From Decision Block 204, if the transmission 100 is currently in the process of shifting from an attained gear to a command gear, then the method moves to Decision Block 206. In Decision Block 206, the transmission controller 18 determines whether an off-going clutch for attaining the shift to the command gear is in a released state, also referred to as disengaged. If the clutch slip exceeds a predetermined slip calibration criterion or if the clutch pressure is less than a predetermined pressure calibration criterion, then the off-going clutch is considered to be in a released state (i.e. disengaged). A slip calibration criterion and a pressure calibration criterion are fixed predetermined values defined for a given clutch that represents whether the given clutch will or will not have frictional capacity.

In Decision Block 206, if the transmission controller 18 determines that the off-going clutch for attaining the shift to the command gear is not in a released state, then the method moves to Block 210. Otherwise, if the transmission controller 18 determines that the off-going clutch is in released state, then the method moves to Block 208. In Block 208, the status of the attained gear ratio is updated to the command gear ratio, thus providing a more accurate representation of the transmission gear state at the time the vehicle operator requests neutral (N). The method then moves to Block 210.

Moving to Block 210 from Block 204, Decision Block 206, or Block 208. In Block 210, the operator of the vehicle 10 via the gear selector or the transmission controller 18 requests to shift the transmission 100 from Neutral (N) back to drive (D), also referred to an N-D shift request. If the transmission is implementing the initial drive to neutral (D-N) shift, then the method proceeds to Decision Block 212.

Moving to Decision Block 212, the transmission controller 18 analyzes information received from the vehicle state sensors and determines a desired shift pattern or scheduled gear ratio. A scheduled gear ratio is the target gear ratio that the transmission is planning to finally attain based on vehicle state information (calibrated on vehicle speed and throttle position), which may be equal to or higher or lower than the originally attained gear ratio. The scheduled gear ratio is compared to the attained gear ratio. If the scheduled gear is not the same as the attained gear ratio, then the method moves to Decision Block 214.

Moving to Decision Block 214, the transmission controller 18 determines if an off-going clutch for attaining the D-N shift is in a hold state, also referred to as being engaged. If the clutch slip is below a predetermined slip calibration criterion or if the clutch pressure is greater than a predetermined pressure calibration criterion, then the off-going clutch is considered to be in a hold state (i.e. engaged). If the off-going clutch is still in a hold state (i.e. engaged), then the method moves to Block 218. In Block 218 the transmission 100 is shifted from the attained gear ratio to the scheduled gear ratio where the shift to neutral mode (N) is aborted (i.e. neutral aborted). Neutral aborted means that the transmission 100 shifted to the next scheduled gear, which may be higher or lower gear ratio that immediately changes the shift and does not complete the shift to neutral that was initially commanded when the operator first shifted into neutral mode (N). This is also referred to as a drive mode to drive mode (D-D) shift in which one drive ratio is shifted back in the same or different drive ratio. The method than proceeds to Block 230 where the method ends.

Referring back to Decision Block 214, if the off-going clutch for attaining the D-N shift is still not in a hold state (i.e. disengaged), then the method moves to Block 216. In Block 216, the attained gear ratio is updated to the commanded neutral gear and the method moves to Block 218. In Block 218 the transmission 100 immediately initiates a shift as an N-D shift. The method then proceeds to Block 230 where the method 200 ends.

Referring back to Decision Block 212, if the scheduled gear ratio is equal to the attained gear ratio, then the method moves to Decision Block 220. In Decision Block 220, if the clutch slip exceeds a predetermined slip calibration criterion or if the clutch pressure is less than a predetermined pressure calibration criterion, then the off-going clutch for the D-N shift is considered to be in a released state (i.e. disengaged). If the off-going clutch is in released state, then the method moves to Block 222.

Moving to Block 222, the off-going clutch for the D-N shift is released and the attained gear ratio is updated to a commanded neutral gear. Moving to Block 224, the transmission 100 is considered to have attained neutral and immediately initiates a shift from that neutral back to the attained drive (D) gear defined as the input to Block 210. The method than proceeds to Block 230 where the method ends.

Referring back to Decision Block 220, if the off-going clutch is not in a released state, then the method proceeds to Block 300. Block 300 is a sub-routine, in which each of the holding clutches are evaluated to determine whether they are below a predetermined slip criterion for a predetermined amount of time. Since the applicable holding clutches may have released during the shift to neutral, Block 300 ensures that a predetermined number of holding clutches are fully applied. It is preferable that the predetermined number is all the holding clutches. From Block 300, the method moves to Decision Block 226.

Moving to Decision Block 226, if the holding clutches are below the predetermined slip criterion for the predetermined amount of time, the method proceeds to Block 228 where the transmission 100 immediately transitions from the current D-N shift and initiates the shift as a D-D where it will return to the initial attained gear and the method proceeds to Block 230 where the method ends. Otherwise, from Block 226 the method moves to Block 224 where the transmission 100 immediately transitions from the current shift, updates the attained gear to neutral (N), and initiates a N-D shift back into the attained gear ratio.

Figure 6:
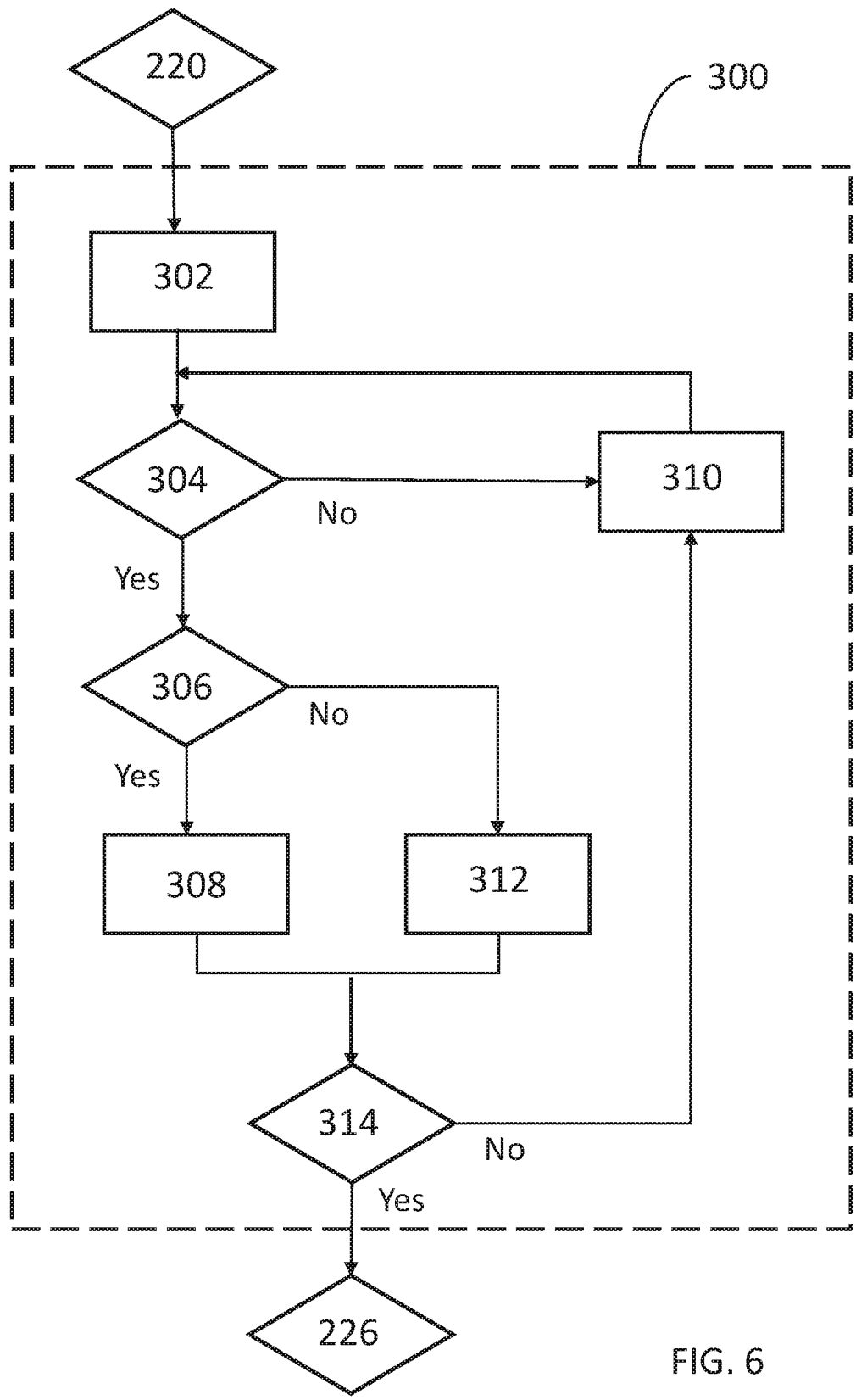
FIG. 6 is a flow chart depicting a sub-routine of the method of FIG. 5, according to an exemplary embodiment.

Referring to FIG. 6, a flow chart depicting a sub-routine 300 to determine whether the off-going clutches are below a predetermined slip criterion for a predetermined amount of time to ensure it is steady in the slip speed of the holding clutch. The exact time would be determined based on the specific hardware/physics of a given transmission system. From Decision Block 220, the sub-routine starts in Block 302 by selecting a first clutch for evaluation. Moving to Decision Block 304, the selected clutch is evaluated to determine whether it is a holding clutch. If the selected clutch is not a holding clutch, the method moves to Block 310 where another clutch is selected and returns to Decision Block 304.

From Decision Block 304, if the selected clutch is a holding clutch, the method moves to Decision Block 306. In Decision Block 306, the holding clutch is evaluated to determine whether the drive mode (D) to neutral mode (N) shift is below a calibrated slip criterion. If the holding clutch is not below a calibrated amount of slip criterion, the clutch timer is reset to zero in Block 312 and the method moves to Decision Block 314. Otherwise, the holding clutch is below a calibrated amount of slip criterion, the method moves to Block 308. In Block 308, the timer of the holding clutch is updated and the method moves to Decision Block 314.

Moving to Decision Block 314 from Block 308 or Block 312, the method determines whether the last clutch has been evaluated. If no, then the method moves to Block 310 where a next clutch is selected. If yes, the method moves to Decision Block 226.

Figure 7:
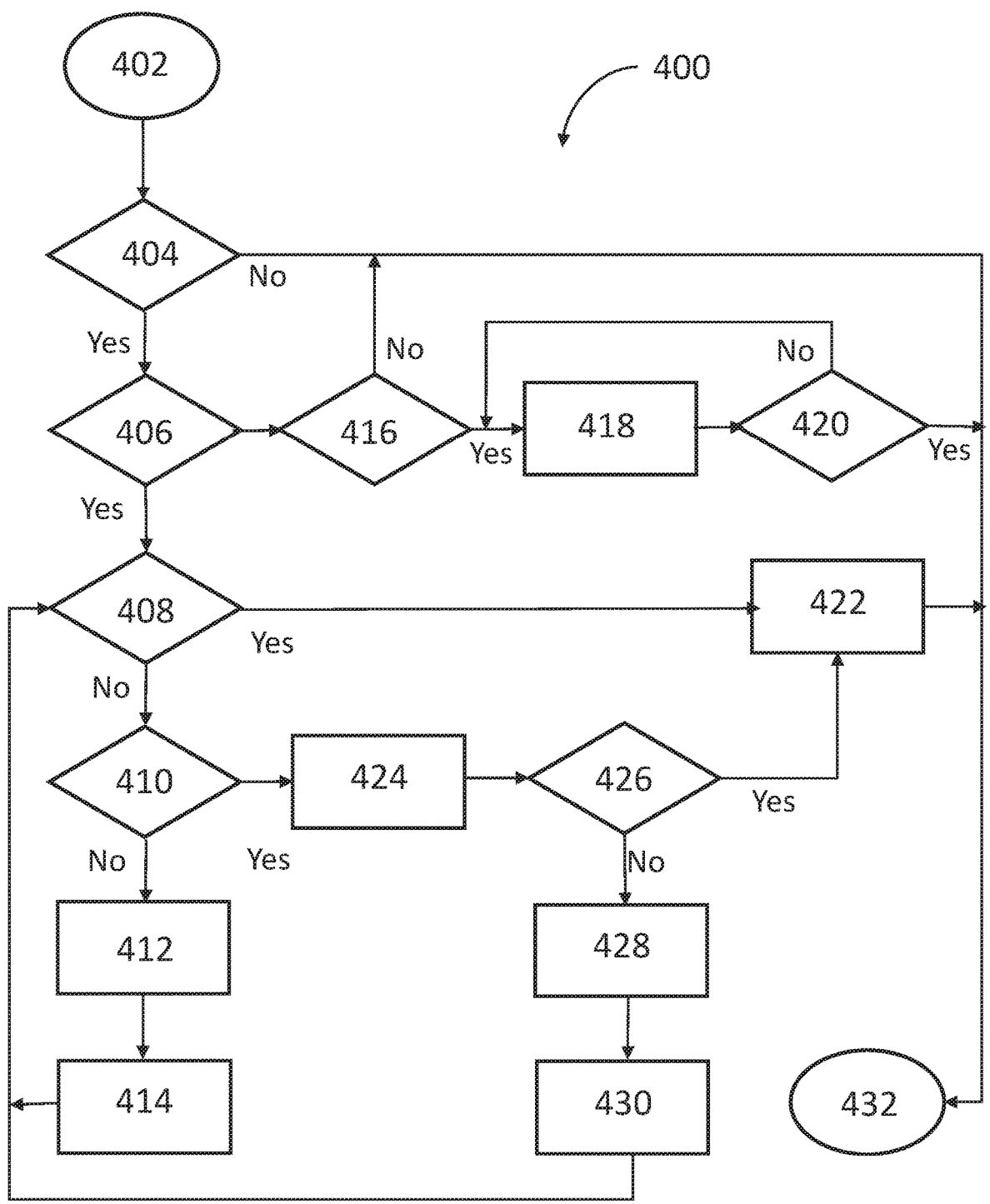
FIG. 7 is flow chart depicting a method of controlling the clutches for implementing the shift abort sequence portion of the method of FIG. 2, according to an exemplary embodiment.

Referring to FIG. 7 a flow chart depicting the method 400 of clutch control strategy for implementing the shift abort sequence of the method of FIG. 5 is illustrated. The method 400 is executed after a shift abort sequence has been determined by the method 200 of FIG. 2. The method 400 begins in Block 402 after the shift abort sequence is determined by method 200 in FIG. 5. Moving to Decision Block 404, the method 400 then moves to Decision Block 406 if the determined shift abort sequence is one of a Neutral to Drive (N-D) shift or a Drive to Drive (D-D) shift. Otherwise the method 400 moves to Block 432 and ends.

In Decision Block 406, the method moves to Decision Block 408 if the on-coming clutch or off-going clutch transitioning to a holding clutch. In Block 408, if the on-coming clutch or off-going clutch slip speed at steady state is below a predetermined RPM threshold for a calibrated amount of time, then the method moves to Block 422 where the holding clutch is engaged and the method moves to Block 432 and ends. Otherwise, the method moves to Decision Block 410.

Moving to Decision Block 410, if the stage 1 pressure ramp is completed or the current clutch pressure reaches a maximum supplied pressure, then the method moves to Block 424. Otherwise the Method moves to Block 412 where the pressure is continued to be ramped up and the clutch slip speed is monitored in Block 414 before returning to Decision Block 408.

Moving to Block 424 from Decision Block 410, when the stage 1 pressure ramp is completed or the current clutch pressure reaches a maximum supplied pressure, the stage 2 pressure ramp control is initiated.

Moving to Decision Block 426 from Block 424, if the stage 2 ramp is finished or when the current clutch pressure reaches maximum supplied pressure, then the method moves to Block 422 where the holding clutch is engaged and the method moves to Block 432 and ends. Otherwise the method moves to Block 428 where the pressure is continued to be ramped up in the stage 2 ramp and the clutch slip speed is monitored in Block 430 before returning to Decision Block 408.

Figure 8:
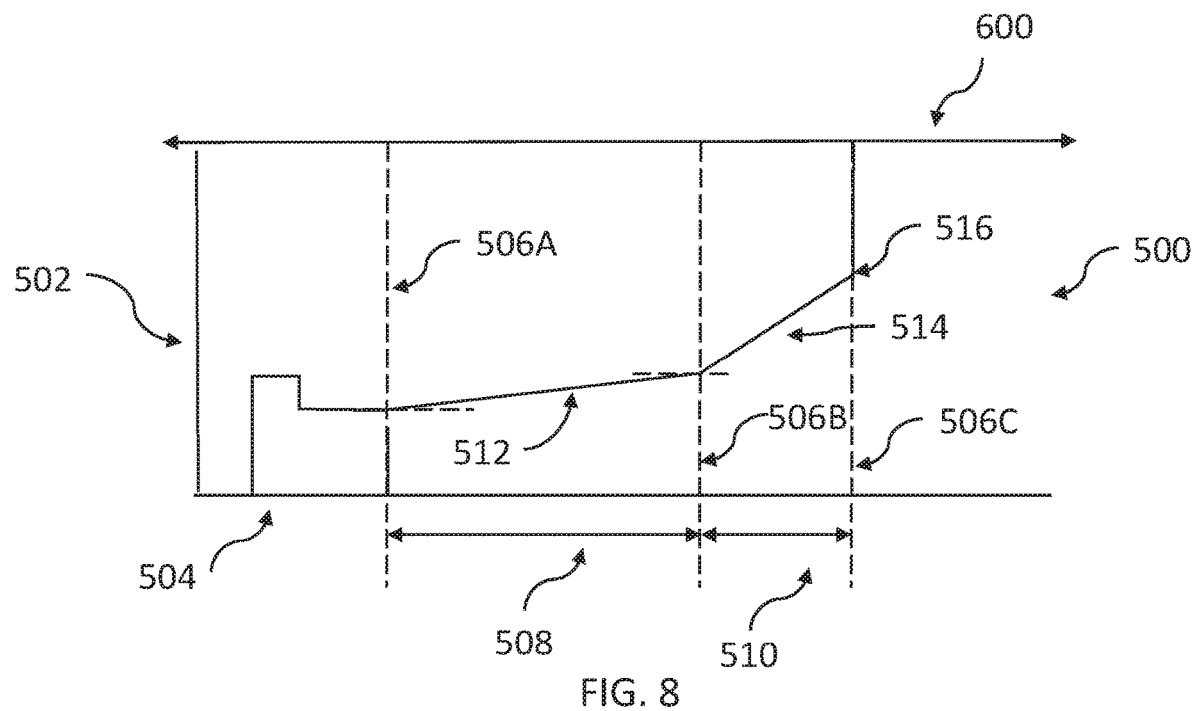
FIG. 8 is schematic chart illustrating a control of an engagement of a holding clutch, according to an exemplary embodiment.

Referring to FIG. 8, the chart 500 illustrates the application of utilizing a dual stage pressure ramp for engaging or re-engaging a holding clutch used to place the transmission into the respective speed ratios involved with the shift sequence from N-D or D-D. The chart 500 includes a y-axis 502 representing the clutch fluid pressure and an x-axis 504 representing time. Marker dash lines 506A and 506B are used to help identify the time of the initiation of the stage 1 ramp 508 and stage 2 ramp 510 of the holding clutch.

Between marker dash lines 506A and 506B, a first pressure profile 512 is applied to the holding clutch during the stage 1 ramp 508 and then a second pressure profile 514 is applied during the stage 2 ramp 510, as shown between marker dash lines 506B and 506C, until the holding clutch is considered to be engaged. The second pressure profile 514 is more aggressive than the first pressure profile. More aggressive means more pressure is introduced over a unit of time. The holding clutch is considered to be engaged at point 516 when the clutch pressure reaches line pressure, reaches a predetermined calibrated 2nd ramp end point, or when the clutch slip is less than a calibrated RPM threshold for a calibrated amount of time, after which it is no longer necessary to continue the pressure ramps as the clutch can be fully engaged with no feel issue. The two stage ramps 508, 510 provide a less obtrusive shock while engaging or re-engaging holding clutches thus providing a more desirable shift feel to the occupants of the vehicle.

Figure 9:
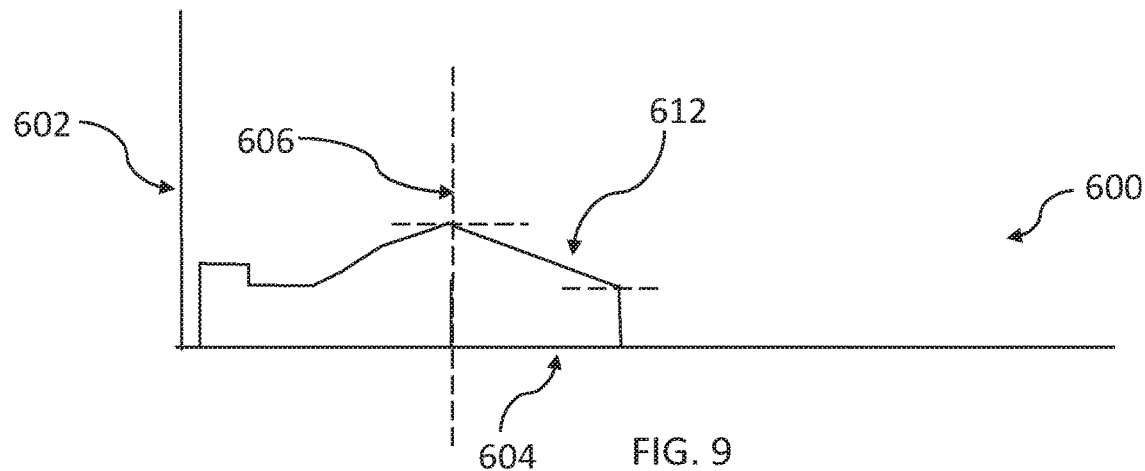
FIG. 9 is schematic chart illustrating a control of a releasing clutch, according to an exemplary embodiment.

Referring to FIG. 9, the chart 600 illustrates relative pressures of an on-coming or off-going clutch that is to be released during an N-D or D-D shift as determined by the method 200. The chart 600 includes a y-axis 602 representing the clutch fluid pressure and an x-axis 604 representing time. A marker dash line 606 is used to help identify the time of the initiation of a steadily declining pressure profile 612, which provides a less obtrusive shock while disengaging a prior on-coming or off-going clutch thus providing a more desirable shift feel to the occupants of the vehicle. Note that the pressures illustrated schematically in the charts 500, 600 may be either commanded pressures, those sought by the controller, or actual pressures, those actually being experienced within the clutches which may lag behind the commanded pressures.

The disclosed method 200 may abort the D-N shift and will either give the operator of the vehicle back the previously attained gear or sequence directly to the pattern drive gear, depending on the transmission state during the D-N shift. Combined with the control method 400 for the holding and disengaging clutches, results in a faster seamless event experienced by the vehicle operator. The control method 400 engages holding clutches via dual stage calibrated ramps while monitoring clutch slips and line pressure and disengages releasing clutches in a controlled synchronized fashion.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of controlling a quick succession drive-neutral-drive (D-N-D) shift in a multi-speed transmission, comprising:
   receiving a D-N-D shift request comprising a drive to neutral (D-N) shift request followed by a neutral to drive (N-D) shift request;
   initiating a drive to neutral (D-N) shift and determining an attained gear after receiving the drive to neutral (D-N) shift request;
   determining a scheduled gear after receiving the neutral to drive (N-D) request;
   determining if the scheduled gear is equal to the attained gear;

determining whether an off-going clutch for attaining the drive to neutral (D-N) shift is in a hold state; and aborting the drive to neutral (D-N) shift and shifting into one of the attained gear and scheduled gear when (i) the scheduled gear is not equal to the attained gear and (ii) the off-going clutch for attaining the drive to neutral (D-N) shift is in the hold state.

2. The method of claim 1, further comprising:

completing a shift to neutral (N) when the off-going clutch for attaining the drive to neutral (D-N) shift is not in the hold state; and shifting into one of the attained gear and scheduled gear from neutral (N).

3. The method of claim 1, further comprising:

determining whether the off-going clutch for attaining the drive to neutral (D-N) shift is in a released state when the scheduled gear is equal to the attained gear;

completing a shift to neutral (N) when the off-going clutch for attaining the drive to neutral (D-N) shift is in the released state; and shifting into the scheduled gear from neutral (N).

4. The method of claim 3, further comprising:

determining whether a predetermined number of holding clutches for attaining the drive to neutral (D-N) shift are below a predetermined slip criterion for a predetermined amount of time when the off-going clutch for attaining the drive to neutral (D-N) shift is not released; and aborting the drive to neutral (D-N) shift and shifting into the scheduled gear when the predetermined number of holding clutches are below a predetermined slip criterion for a predetermined amount of time.

5. The method of claim 4, further comprising:

completing a shift to neutral (N) when the predetermined number of holding clutches are not below the predetermined slip criterion for the predetermined amount of time; and shifting into the scheduled gear from neutral (N).

6. The method of claim 1, further comprising:

determining whether the multi-speed transmission is in a process of shifting from the attained gear to a command gear upon receiving the drive to neutral (D-N) shift request;

determining whether an off-going clutch for attaining the attained gear to the command gear shift is in a released state; and updating the attained gear to equal to the command gear when the off-going clutch for attaining the attained gear to the command gear shift is in a released state.

7. The method of claim 1, further comprising:

applying a two stage pressure ramp when activating a holding clutch for attaining one of a D-N shift, N-D shift, and D-D shift; and wherein the two stage pressure ramp includes a first stage having a first pressure profile followed by a second stage having a second pressure profile, and wherein the second pressure profile includes a more aggressive pressure profile than the first pressure profile.

8. The method of claim 7, further comprising releasing one of the on-coming clutch and the off-going clutch using a steadily declining pressure profile such that an obtrusive shock to the multi-speed transmission is minimized.

9. The method of claim 4, wherein determining whether the predetermined number of holding clutches are below a predetermined slip criterion for a predetermined amount of time, includes looping through each holding clutch to determine whether each clutch is below a calibrated amount of slip.

10. The method of claim 5, wherein the predetermined number of holding clutches is equal to all the holding clutches required for a drive to neutral (D-N) shift.

11. A method of controlling a quick succession drive-neutral-drive (D-N-D) shift in a multi-speed transmission, comprising:

receiving a D-N-D shift, including a drive to neutral (D-N) shift request followed by a neutral to drive (N-D) shift request;

determining whether the multi-speed transmission is in a process of shifting from an attained gear to a command gear during the D-N shift request;

determining whether an off-going clutch is in a released state when the multi-speed transmission is in the process of shifting from the initial attained gear to the command gear during the D-N request;

updating the attained gear equal to the command gear when the off-going clutch is in a released state;

determining a scheduled gear following the neutral to drive (N-D) request;

determining if the scheduled gear is equal to the attained gear;

determining whether an off-going clutch for the drive to neutral (D-N) shift is in a hold state; and implementing one of the following:

(I) aborting the drive to neutral (D-N) shift and shifting into one of the attained gear and scheduled gear when (i) the scheduled gear is not equal to the attained gear, and (ii) the off-going clutch for the drive to neutral (D-N) shift is in the hold state; and (II) completing a shift to neutral (N) when the off-going clutch for the drive to neutral (D-N) shift is not in the hold state followed by shifting from neutral (N) into one of the attained gear and scheduled gear.

12. The method of claim 11, further comprising:

determining whether the off-going clutch for the drive to neutral (D-N) shift is in a released state when the scheduled gear is equal to the attained gear;

completing a shift to neutral (N) when the off-going clutch for the drive to neutral (D-N) shift is in the released state; and shifting into the scheduled gear from neutral (N).

13. The method of claim 12, further comprising:

determining whether all holding clutches are below a predetermined slip criterion for a predetermined amount of time when the off-going clutch for the drive to neutral (D-N) shift; and implementing one of the following:

(I) aborting the drive to neutral (D-N) shift and shifting into the scheduled gear when all holding clutches are below a predetermined slip criterion for a predetermined amount of time; and (II) completing a shift to neutral (N) when all holding clutches are not below a predetermined slip criterion for a predetermined amount of time and shifting into the scheduled gear from neutral (N).

14. The method of claim 13, further comprising:

engaging a holding clutch for attaining one of a drive to drive (D-D) shift, a neutral to drive (N-D) shift, and a drive to drive (D-D) shift by applying a two stage pressure ramp; and dis-engaging one of an off-going clutch and an on-coming clutch by applying a steadily declining pressure profile.

15. The method of claim 14, wherein the two stage pressure ramp includes a first stage having a first pressure profile followed by a second stage having a second pressure profile, wherein the second pressure profile is more aggressive than the first pressure profile.

16. A system for controlling a drive-neutral-drive (D-N-D) shift in a multi-speed transmission, comprising:
   a multi-speed transmission;
   a shifter configured to receive a D-N-D shift command; and
   a transmission controller in electronic communication with the multi-speed transmission and the shifter, wherein the transmission controller comprises:
   a non-transitory computer readable medium storing instructions to implement a method for controlling a D-N-D shift of the multi-speed transmission, and
   a processor configured for accessing the instructions and implementing the method, wherein the method comprises of:
   receiving a D-N-D shift, including a drive to neutral (D-N) shift request followed by a neutral to drive (N-D) shift request,
   determining a shift abort sequence upon receiving the drive to neutral (D-N) shift request, and
   implementing the shift abort sequence, wherein the shift abort sequence includes one of (i) aborting the shift to neutral resulting in a drive to drive (D-D) shift and (ii) shifting into neutral (N) before shifting back into drive (D).

17. The system of claim 16, wherein determining a shift abort sequence comprises:
   determining a scheduled gear following the neutral to drive (N-D) request;
   determining if the scheduled gear is equal to the attained gear;
   determining whether an off-going clutch for the drive to neutral (D-N) shift is in a hold state; and
   aborting the drive to neutral (D-N) shift and shifting into one of the attained gear and scheduled gear when (i) the scheduled gear is not equal to the attained gear and (ii) the off-going clutch for the drive to neutral (D-N) shift is in the hold state.

18. The system of claim 17, wherein determining a shift abort sequence further comprises:
   determining whether the off-going clutch for the drive to neutral (D-N) shift is in a released state when the scheduled gear is equal to the attained gear; and
   completing a shift to neutral (N) when the off-going clutch for the drive to neutral (D-N) shift is in the released state.

19. The system of claim 18, wherein determining a shift abort sequence further comprises:
   determining whether a predetermined number of holding clutches are below a predetermined slip criterion for a predetermined amount of time when the off-going clutch for the drive to neutral (D-N) shift; and
   aborting the drive to neutral (D-N) shift and shifting into the scheduled gear when the predetermined number of holding clutches are below a predetermined slip criterion for a predetermined amount of time.

20. The system of claim 19, wherein determining a shift abort sequence further comprises:
   completing a shift to neutral (N) when the predetermined number of holding clutches are not below a predetermined slip criterion for a predetermined amount of time;
   engaging an on-coming holding clutch for shifting to attain one of a drive to neutral (D-N) shift, a neutral to drive (N-D) shift, and a drive to drive (D-D) shift using a two stage pressure ramp; and
   dis-engaging one of an off-going clutch and an on-coming clutch using a steadily declining pressure profile.

\* \* \* \* \*